D. G. BENDER.
CULINARY APPARATUS.
APPLICATION FILED DEC. 4, 1919.

1,397,852.

Patented Nov. 22, 1921.
2 SHEETS—SHEET 1.

Inventor
David G. Bender

By Robert Robb
Attorney

D. G. BENDER.
CULINARY APPARATUS.
APPLICATION FILED DEC. 4, 1919.
1,397,852.
Patented Nov. 22, 1921.
2 SHEETS—SHEET 2.
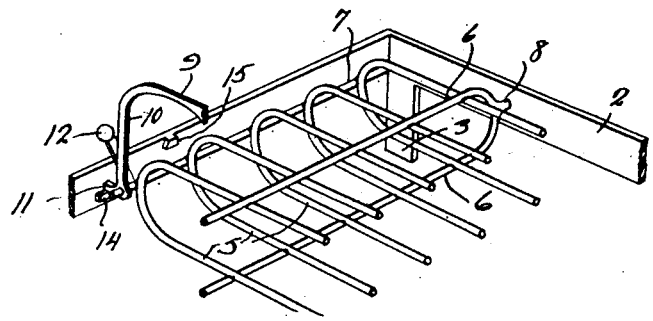
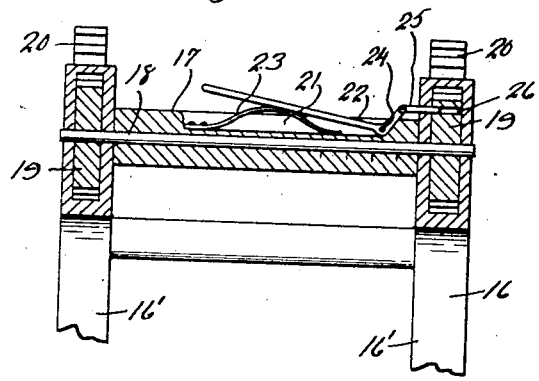
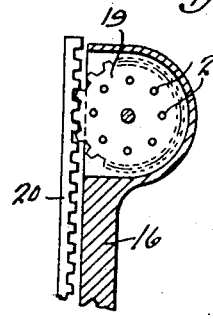
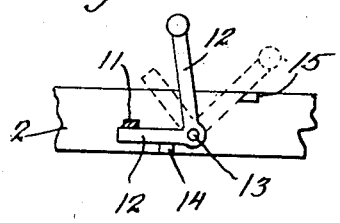
Inventor
David G. Bender
By Robert Roth
Attorneys

UNITED STATES PATENT OFFICE.

DAVID G. BENDER, OF BLUE ISLAND, ILLINOIS.

CULINARY APPARATUS.

1,397,852.

Specification of Letters Patent.  Patented Nov. 22, 1921.

Application filed December 4, 1919. Serial No. 342,517.

*To all whom it may concern:*

Be it known that I, DAVID G. BENDER, a citizen of the United States, residing at Blue Island, in the county of Cook and State of Illinois, have invented certain new and useful Improvements in Culinary Apparatus, of which the following is a specification.

The present invention relates to improvements in culinary apparatus or utensils designed particularly for cooking doughnuts and similar foods, an object in view being to provide a simple device to enable the doughnuts to be cooked in quantities at the expense of a minimum amount of labor and time.

The apparatus is especially designed to facilitate the turning of the doughnuts during the cooking process, this being required to be done a number of times to produce a high class product but is difficult to do without damaging the doughnuts, the whole batch with the present invention being turned at one time by a simple movement of the inverting means.

Likewise a further object in view is to provide equal facility in the removal of the doughnuts after they have been cooked and to provide for adjustment of the doughnut carrying means with respect to the level of the liquid in which they are immersed for cooking.

These and such other objects as may hereinafter appear are attained by the novel construction, combination and arrangement of parts to be hereinafter specifically described and claimed. Reference will now be had to the accompanying drawings forming a part of this specification, wherein:

Fig. 4 is a fragmentary perspective view of the doughnut carrying means showing more clearly the wire rack on which the doughnuts are supported.

Fig. 5 is a fragmentary sectional view through the handle operating means.

Fig. 6 is a similar view taken at right angles to the view shown in Fig. 5.

Fig. 7 is a detailed fragmentary view showing the position assumed by the doughnut racks when filling the same preliminary to cooking, and Fig. 8 is a detail view of the supporting means for holding the racks in horizontal position, as when cooking.

Throughout the following detail description and on the several figures of the drawings, similar parts are referred to by like reference characters.

Figure 1:
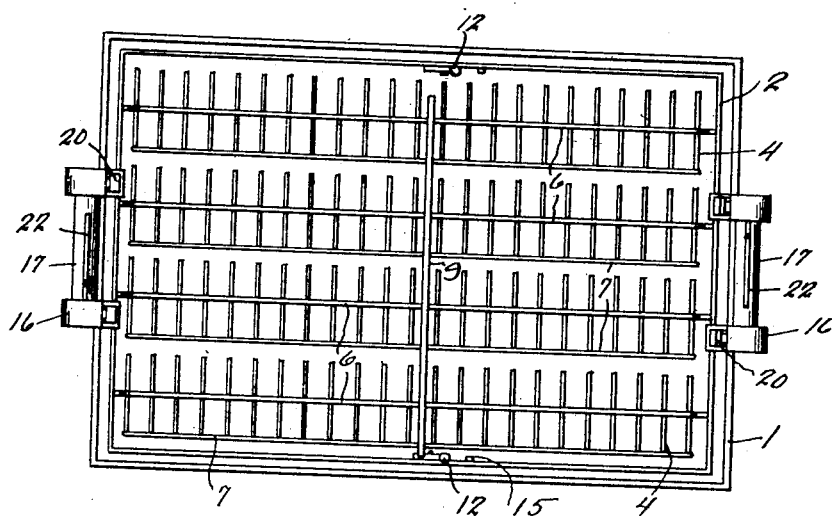
Figure 1 is a top plan view of an apparatus constructed in accordance with this invention.

Referring to the drawings and specifically describing a preferred form of the apparatus, 1 designates a vessel or receptacle in which the cooking medium is disposed, said receptacle being of any suitable size and configuration, determined only by the capacity which it is desired that the apparatus shall have. This receptacle in carrying out the process of cooking is placed upon a stove and the liquid or grease in which the doughnuts are cooked is maintained at the proper temperature for carrying out the process. The doughnut carrying means now to be described is adapted to be inserted into the receptacle after the pastry has been prepared and placed therein.

Figure 2:
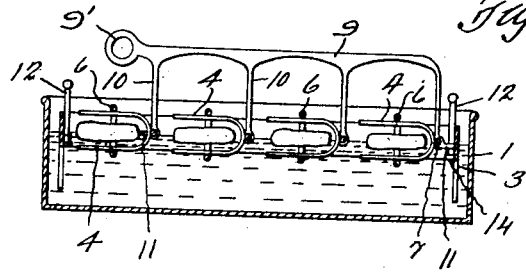
Fig. 2 is a transverse sectional view therethrough.
Figure 3:
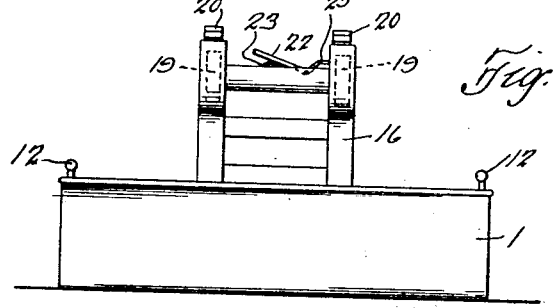
Fig. 3 is an end elevation of the apparatus.

The doughnut carrying means, so called for the purpose of this description, consists of a light rectangular, metal frame 2 having at each of its corners a suitable leg 3 for supporting the frame upon a table or similar support during filling and emptying of the racks mounted therein. It will be observed in Figs. 1 and 2 particularly that a series of wire racks, designated 4, are arranged in parallel relation extending longitudinally of the frame 2. These racks consist of U-shaped wire members 5 connected together and held in spaced relation by the cross wires 6 at the top and bottom and a similar wire 7 at the closed or rear end of the U-shaped elements. The spacing wires 6 at the end of each rack are preferably united to form a pivot indicated at 8 which has its bearing in the end of the frame 2, one of such pivots being formed at either end of the rack. It should be understood that any other method of pivoting the racks upon the frame 2 may be employed and I do not wish to be confined to the particular method just described. Any number of these racks may be provided, limited only by the size of said racks and the capacity of the frame 2. Extending transversely of the frame 2 and overhanging the racks 4 is a bar 9 which is connected to the rear spacing wire 7 of each rack by a downwardly extending finger 10. The end bar fingers 10 at the sides of the frame 2, as shown in Fig. 7 most clearly, are each provided with a lateral projection 11 which is adapted to coact with an adjacent supporting catch 12 pivotally mounted at 13 upon the inner face of the frame 2. Each of these catches in turn coacts with a stop projection 14 in one position and a second stop 15 in another position, as shown in Fig. 8. The catch 12, in other words, is arranged in such a position that it will lie in the path of movement of the turning bar 9 when it is in the full line position shown in Fig. 8, but when it is shifted to the dotted line position the projection 11 will be permitted to pass thereby for purposes hereinafter more specifically pointed out. At one end the turning bar 9 is provided with a fingerpiece 9' and when this is actuated in a direction transversely of the frame it will simultaneously turn the racks 4 upon their pivots the proper amount to completely invert the racks, or said racks may be turned just sufficiently to position them at an angle for filling or discharging purposes.

At each end of the frame 2 is provided a handle support 16 which projects from said frame so as to rest upon the rim of the receptacle 1 to support the doughnut carrying means just described over or in said receptacle. These handle supports each embody a manipulating handle grip 17 fixed to a shaft 18 which is journaled in the spaced sides 16' of the handle support and which shaft carries at either end a pinion 19 meshing with racks 20 which in turn extend upwardly from the adjacent end of the frame 2. The handle grip 17 is recessed as at 21 to accommodate a locking lever 22 and a spring 23 coacting therewith. The locking lever 22 is pivotally secured at 24 and carries a locking pin 25 extending into one of the sides 16' of the handle support and is adapted to project into a notch or opening 26 in the adjacent pinion 19. It will be apparent that the locking member just described will hold the handle against actuation or, more strictly speaking, against rotation and in this manner the frame 2 will be supported in a stationary position at any desired level with respect to the liquid contained within the vessel 1 but should it be desired to raise or lower the frame and the contents thereof, the locking members of the handles may be disengaged from their pinions and rotation of the handle grips 17 will permit the frame to be lowered or raised at will until the proper position is assumed, whereupon the locking members are released and engaged in the manner specified to prevent movement of the frame.

In the art of cooking doughnuts it has been customary to cook quantities by placing the formed pastry upon a tray and inserting it into the vessel containing the cooking medium, holding the tray in a position at the surface of the liquid until the cooking process has progressed to a point where the doughnut will float then allowing the tray to drop to the bottom of the vessel where it remains until the doughnuts are to be removed. During the cooking process each doughnut is turned from time to time so as to insure that it shall be thoroughly cooked upon each side, but it is practically impossible to carry out this process with any uniformity of cooking or without mutilating the doughnut if it is made up of ingredients that will produce a delicate or high class product. To thus carry out the cooking process is more or less a drudgery and does not produce satisfactory results so that it has been my object to greatly facilitate the operation and at the same time to improve the doughnuts very materially so far as quality and appearance are concerned.

With my apparatus I proceed as follows: The doughnut carrying means, that is the frame 2 and its racks, is placed upon a table or other similar support, resting upon its legs 3 provided for this purpose, these legs being of sufficient length to permit the racks in the frame to be rotated with ample clearance with respect to the supported surface. The arm 9 is raised, then the catches 12 at each end of the frame 2 are shifted into their dotted line position shown in Fig. 8 whereupon the doughnut racks will be allowed to move about their pivots and moved by arm 9 until their open end is presented at a convenient position to enable the doughnut pastry to be introduced upon said racks side by side, this position being shown most clearly in Fig. 7. When the racks have been filled they are again arranged in their horizontal position by manipulation of the turning bar 9 and the catches 12 shifted into the full line position shown in Fig. 8 so as to lie beneath the projection 11 of the turning bar which will rest upon one arm of the catch. By means of the handle supports the doughnut carrying means is now carried to the receptacle 1 in which the cooking medium is heated, and rested upon the rim of the vessel 1. The racks or the frame carrying the same is raised or lowered in the manner hereinbefore described until the pastry rests upon the surface of the liquid. The doughnuts will soon float freely in their individual racks and may be allowed to remain there until one side has been sufficiently cooked, whereupon the turning bar 9 is actuated, that is raised and moved transversely of the receptacle so that the racks will turn on their pivots, gently inverting the doughnuts supported within said racks. The bar again engages with the catch 1 at the other side of the frame and holds the doughnuts in horizontal cooking position until the other side is cooked somewhat. The best results are obtained, as will be understood by those skilled in this art, by turning the doughnuts quite frequently. With this apparatus it is a simple matter to do this without injury to the pastry articles which are very gently engaged only during turning in the manner above specified. Owing to the connection of the bar 9, as stated, they may be turned any number of times until thoroughly done. When the cooking is completed the doughnut carrying means is bodily removed from the receptacle and placed upon the support or table, whereupon the racks are turned slightly into an angle with the open end thereof directed downwardly. All of the doughnuts by this action will be discharged from their racks gently on the support, after which the carrying means may be again filled with more pastry and the cooking process continued in the manner above specified.

With apparatus of this character it will be apparent that the drudgery of cooking articles of this character is practically eliminated, while the apparatus for handling the pastry is very simple and easy to operate.

It will be apparent that slight changes may be made in the details of construction without departing from the spirit of the invention and within the scope of the claims hereto appended.

Having thus described my invention, what I claim as new is:

1. Culinary apparatus of the class described, comprising a vertically adjustable frame, a doughnut-carrying rack pivotally mounted in said frame, adjustable means for sustaining said rack in a horizontal position and operable to permit said rack to swing about its axis, and turning means connected to the rack for rotating the same.

2. Culinary apparatus of the class described comprising a frame, a doughnut carrying rack pivotally mounted in said frame, adjustable means for sustaining the rack in a horizontal position and operable to permit the rack to swing about its axis, and turning means connected to the rack for rotating the same.

3. Culinary apparatus of the class described comprising a frame, a doughnut carrying rack pivotally mounted in said frame, stop means on the frame for holding the rack in horizontal position, said means being displaceable to permit shifting of the rack about its pivot, and means for turning the rack.

4. Culinary apparatus of the class described comprising a frame, a plurality of doughnut carrying racks independently revolubly mounted therein, means for turning said racks, and means with which said turning means coacts to support the racks in horizontal position.

5. Culinary apparatus of the class described comprising a frame, a plurality of doughnut carrying racks revolubly mounted therein, means for turning said racks, and means with which said turning means coacts to support the racks in horizontal position, said supporting means being displaceable to permit swinging of the racks from the horizontal position.

6. Culinary apparatus of the class described, comprising a frame, a plurality of open ended doughnut carrying racks mounted therein, and means for depressing said racks to dispose the mouths of said racks in position for filling.

7. Culinary apparatus of the class described comprising a frame, a plurality of wire racks mounted therein and open at one side, pivot means for said racks, and a turning member connected to the racks and adapted to depress the racks for filling or raise the racks for discharging purposes.

8. Culinary apparatus of the class described comprising a frame, a plurality of wire racks mounted therein and open at one side, pivot means for said racks, a turning member connected to the racks and adapted to depress the racks for filling or raise the racks for discharging purposes, and shiftable means on the frame to hold the racks in horizontal cooking position.

9. A doughnut cooking rack of the class described comprising a frame, leg members for supporting said frame, a plurality of doughnut supporting racks, each consisting of a series of U-shaped wire members having cross-wires holding the U-shaped members in spaced relation, pivot means for each of said racks permitting them to swing about their longitudinal axes, a turning bar having depending fingers pivotally connected to said racks and shiftable to rotate said racks about their axes, and means on the frame coacting with said turning member for sustaining the racks stationary.

10. In culinary devices of the class described, the combination of a receptacle adapted to contain a cooking medium in which the articles to be cooked are immersed, means for holding said articles during the cooking process including a frame, and handle members forming a part of said frame and constituting the supporting means for sustaining the said holding means in operative position upon the receptacle, said handle members being operable to adjust the frame with respect to the level of the cooking medium in the receptacle.

11. In culinary devices of the class described, the combination of a receptacle adapted to contain a cooking medium in which the articles to be cooked are immersed, means for holding said articles during the cooking process including a frame and invertible racks, means for inverting said racks, and handle members carried by said frame including rack and pinion elements for raising and lowering the frame with respect to the level of the liquid in the receptacle.

12. In culinary devices of the class described, the combination of a receptacle adaped to contain a cooking medium in which the articles to be cooked are immersed, means for holding said articles during the cooking process including a frame and invertible racks, means for inverting said racks, handle members carried by said frame including rack and pinion elements for raising and lowering the frame with respect to the level of the liquid in the receptacle, and locking means coacting with said handle members for holding the racks at adjusted position.

13. In culinary devices of the class described, the combination of a receptacle adapted to contain a cooking medium in which the articles to be cooked are immersed, doughnut carrying means adapted to coöperate with the receptacle and including a frame, handle members carried by said frame, and constituting support means for sustaining the frame from the rim of the receptacle and comprising a handle grip revolubly mounted, rack and pinion elements operable by the handle grip, and locking means engageable with the pinion elements to hold the frame at adjusted positions.

In testimony whereof I affix my signature.

DAVID G. BENDER.